May 12, 1959     P. N. LEHR     2,886,623
BATTERY ASSEMBLY FOR HEARING AIDS
Filed March 24, 1954
FIG. 1.
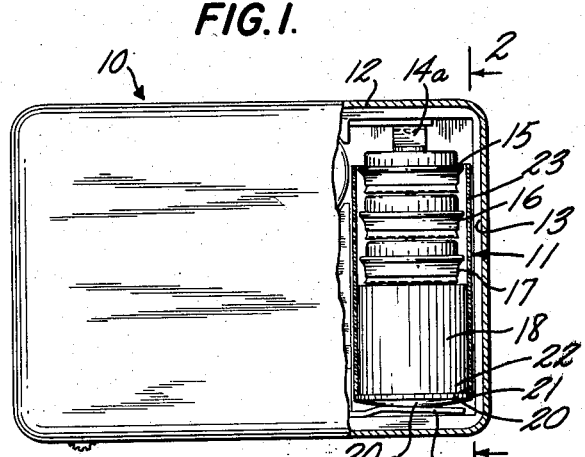
FIG. 3.
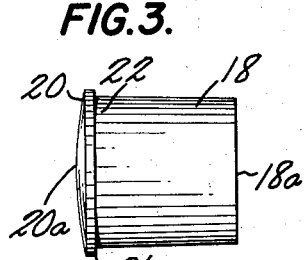
FIG. 2.
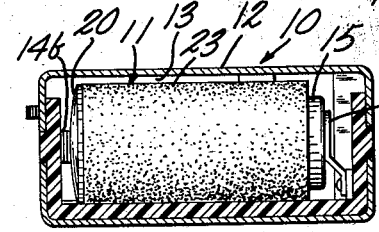
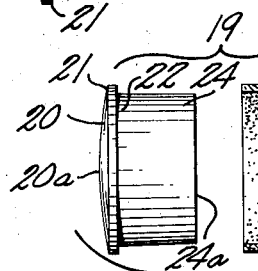
FIG. 4.
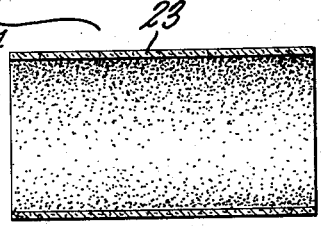
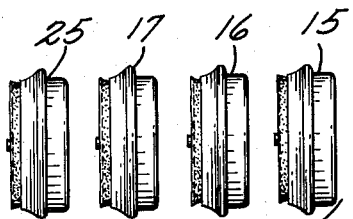
FIG. 5.
FIG. 6.
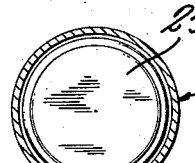
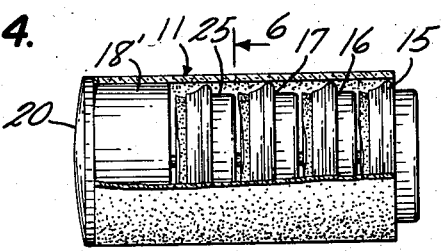
FIG. 7.
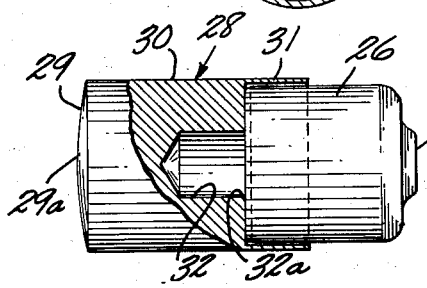
INVENTOR.
PHILIP N. LEHR
BY
*Campbell, Brumbaugh, Free & Graves*
his ATTORNEYS

United States Patent Office 2,886,623
Patented May 12, 1959

---

2,886,623

BATTERY ASSEMBLY FOR HEARING AIDS

Philip N. Lehr, Huntington, N.Y., assignor to Dictograph Products Company, Inc., Jamaica, N.Y., a corporation of Delaware Application March 24, 1954, Serial No. 418,405

6 Claims. (Cl. 136—173)

This invention relates to hearing aids and more particularly to hearing aid assemblies adaptable to make use, at the selection of the user, of various numbers of individual battery units.

Conventionally hearing aids are provided with battery chambers which must be filled with a certain fixed number of batteries in order to operate the unit, the user having no opportunity to utilize batteries in numbers bearing a direct relationship to his hearing needs. Thus, a user of a hearing aid requiring relatively little amplification must buy and consume batteries at more or less the same rate as a person who requires the fullest amplification attainable.

In accordance with the present invention, a hearing aid is provided in which the battery chamber is of fixed length to accommodate the maximum number of batteries for which the electrical circuits are designed, and a battery assembly or pack, also of fixed size, is provided to include selectable dummy battery means all of which are of sizes corresponding to an integral number of batteries. The dummy battery means are used in combination with actual batteries to fill the battery chamber and to form a complete power circuit. A person requiring relatively little hearing supplement, for example, may insert particular dummy battery means having the geometry of several batteries and including electrically connected front and back terminals so that when nested with conventional batteries a complete circuit will be set up within the hearing aid. A user may include among his hearing aid equipment dummy means corresponding to one, two, three, or more batteries, selecting at any given time the one most suitable for prevailing conditions.

A battery assembly can be made up of a dummy cell having electrically united front and back contacts, one to engage a battery contact and the other a terminal in the hearing aid or, if such is used, container means to hold the individual batteries in place and to unify the assembly for convenient manipulation.

The above and other features and advantages of the present invention may be better understood by reference to the accompanying drawing in which:

Figure 1 is a top view partly broken away of a hearing aid unit, the broken away portion revealing the battery assembly mounted in a battery-receiving chamber;

Figure 2 is a view in transverse section of the hearing aid of Figure 1 taken on the line 2—2 thereof, looking in the direction of the arrows;

Figure 3 is a side view of a dummy battery unit for use in a battery assembly and having a shank length equivalent to the displacement of exactly two battery cells;

Figure 4 is an exploded view partly in vertical section showing the parts of a battery assembly including a dummy battery equivalent to one battery cell and four standard battery cells;

Figure 5 is a side view partly broken away, showing the component parts of Figure 4 assembled as a battery pack;

Figure 6 is a view in transverse section taken on the line 6—6 of Figure 5 looking in the direction of the arrows; and Figure 7 is a side view, partly in vertical section, showing a battery assembly using an alternative dummy battery design for use with another type of battery cell.

Referring to Figure 1 the numeral 10 designates a hearing aid unit which may include for example an amplifier (not shown) and a battery assembly 11 for energizing the amplifier. The unit 10 is encased in an insulating housing 12 having a battery chamber 13 of a fixed length as defined by contact or terminal elements 14a and 14b at opposite ends thereof. Preferably at least one of the contact elements 14a and 14b is resiliently supported in order that the battery assembly 11 can be conveniently clamped in position.

The battery assembly 11 can as shown in Figures 1 and 2 be made up of a plurality of battery cells 15, 16 and 17 and dummy cell means 18, which can be incorporated in a battery holding assembly 19 (Figure 4). The holding assembly 19 includes a head portion 20 having an external electrical contact 20a on its leading surface, a shoulder 21 and a tail or shank piece 22 which in the illustrated arrangements of Figures 1–6 is formed integrally with the dummy means 18. The rearmost or trailing surface of the dummy means 18 affords an electrical contact 18a (to be engaged by a battery terminal) electrically connected to the forward contact 20a and spaced therefrom by a preestablished distance. The assembly is completed by wall means in the form of a sleeve 23 seated against the shoulder 21, attached as by cementing to the shank 22 and dummy means 18, and extending rearwardly to define a space for the battery cells. The length of the wall means 23 is such that the back or second terminal of the last battery cell 15 is in position to be engaged by the terminal means 14a of the hearing aid.

The number of cells which the user employs within the battery assembly 11 may vary in accordance with his hearing needs. Thus if the maximum hearing assistance is required, the dummy means 18 may be dispensed with and the wall means 23, fronted by a suitable head portion, filled with batteries to furnish the maximum voltage for operating the hearing aid amplifier. In the event relatively less hearing assistance is required a dummy means can be used which displaces or takes the place of different numbers of cells. In the arrangement of Figures 1–3 the dummy means 18 replaces two cells; in the arrangement of Figures 4, 5 and 6, in which parts corresponding to those of Figures 1–3 are identified by like reference numerals, there is shown dummy cell means 24 having a contact surface 24a and dimensioned axially to replace only one cell, with an additional operating battery cell 25 being added in the sleeve.

In the arrangement of Figures 1–6, therefore, it will be understood that the dummy means has a length corresponding to the length of an integral number of battery cells, with the spacing between the contacts 18a and 20a representing the dummy length plus the axial length of the head portion 20, if such is used. A hearing aid user might therefore keep among his supplies a series of battery holding assemblies incorporating dummy means of different lengths so that he might readily prepare a battery assembly of any desired potency. In this fashion a user would only be required to utilize batteries in accordance with his hearing needs which is to say battery requirements would not be dictated by the standardized dimensions of the battery chamber in his hearing aid.

In the event a larger type hearing aid battery is used such as that identified by the numeral 26 in Figure 7, a different design of dummy means 28 may be provided in accordance with the invention to make up the unified battery assembly or pack. The dummy means 28 is formed with a leading surface 29 bearing an electrical contact 29a and having an elongated shank 30. Rearwardly extending wall means in the form of a sleeve 31 can be attached to shank 30 to receive the end of the battery 26, thereby unifying the assembly. In the arrangement of Figure 7 the wall means 31 are formed integrally with the shank 30, whereas in the arrangement of Figures 1-6 the wall means 23 are attached by cementing to the shank 22 and to the dummy cell means 18.

A counter bore 32 can be formed along the axis of the shank. As in the case of the arrangements described above having reference to Figures 1-6, the battery assembly of Figure 7 is designed to be received in a hearing aid battery chamber of a fixed length, with the dummy cell means 28 displacing an integral number of conventional battery cells.

In the arrangement of Figure 7, the battery 26 should be inserted in the sleeve 31 with its terminal contact 33, which is electrically insulated from the battery casing, pointed outwardly. In this fashion the dummy cell means 28 will be engaged by the casing of the battery cell to complete the electrical circuit to the contact 29a. In the event the battery cell is inserted with the contact terminal 33 facing inwardly, insulation can be used between the sleeve 31 and the battery casing to prevent short-circuiting. In the arrangements of Figures 1-6, however, the batteries can be inserted in the sleeve 23 with either pole facing inwardly without danger of short-circuiting so long as the sleeve 23 is formed of insulating material.

Although preferred embodiments of the invention have been illustrated and described herein, it is to be understood that the invention is not limited thereby, but is susceptible of changes in form and detail within the scope of the following claims.

I claim:

1. In a hearing aid device having a housing for hearing aid components, wall means in the housing defining a battery chamber, and terminal means in the chamber connected electrically in a power circuit and defining a space of preestablished length for receiving a battery assembly of preestablished length, the invention comprising a battery assembly adapted to be mounted in the space to bridge the terminal means and including at least one battery cell and, abutted front to back therewith, dummy cell means having a length corresponding to the length of an integral number of battery cells, and wall means to hold the dummy cell means and the battery cell in alignment to form a unitary assembly for insertion into and removal from the battery chamber.

2. Apparatus according to claim 1, said wall means of the battery assembly being attached to the dummy cell means and comprising a sleeve portion within which at least one battery cell may be nested.

3. Apparatus according to claim 1, said dummy cell means including an electrically conducting cylindrical portion having a diameter corresponding substantially to the diameter of the battery cells, said wall means for holding the battery assembly in alignment comprising a sleeve fitted over the cylindrical portion and extending coaxially away therefrom to define a space for receiving battery cell means with one terminal in electrical contact with the dummy cell means, and an electrically conducting head portion electrically connected to said dummy cell means and including an external electrical contact adapted to engage one terminal means of the hearing aid, the other terminal of said battery cell means being adapted to engage other terminal means of the hearing aid to complete an electrical power circuit.

4. Apparatus according to claim 3, said sleeve being formed of electrically insulating material and said battery cells being encased partly in a metallic covering constituting one of the electrical terminals thereof.

5. Apparatus according to claim 4, said sleeve being of a length extending away from the dummy cell for a distance slightly less than an integral number of battery cells so that the back end of the last cell projects out of the back of the sleeve to engage terminal means in the hearing aid.

6. Apparatus according to claim 1, said dummy cell means comprising a cylinder formed of a single piece of metal, and a cylindrical recess formed in the back end of the dummy cell coaxially thereof to receive at least part of a battery cell.

References Cited in the file of this patent

UNITED STATES PATENTS

| | | |
|---|---|---|
| 1,464,573 | Heise et al. | Aug. 14, 1923 |
| 1,887,811 | Ikin | Nov. 15, 1932 |
| 1,920,151 | Ruben | July 25, 1933 |
| 2,197,314 | Olson | Apr. 16, 1940 |
| 2,333,028 | Merrill | Oct. 26, 1943 |
| 2,439,408 | Mitchell | Apr. 13, 1948 |
| 2,449,568 | Shriro et al. | Sept. 21, 1948 |
| 2,495,476 | Posen et al. | Jan. 24, 1950 |
| 2,651,745 | Marrow | Sept. 8, 1953 |
| 2,668,197 | Gustafson | Feb. 2, 1954 |

FOREIGN PATENTS

| | | |
|---|---|---|
| 569,482 | Great Britain | May 25, 1945 |